US012615551B2

(12) United States Patent
Sekita et al.

(10) Patent No.: US 12,615,551 B2
(45) Date of Patent: Apr. 28, 2026

(54) COMMUNICATION CONTROL DEVICE AND COMMUNICATION CONTROL METHOD

(71) Applicant: Nissan Motor Co., Ltd., Yokohama (JP)

(72) Inventors: Suguru Sekita, Kanagawa (JP); Mitsunori Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/716,991

(22) PCT Filed: Dec. 7, 2021

(86) PCT No.: PCT/JP2021/045006
§ 371 (c)(1),
(2) Date: Jun. 6, 2024

(87) PCT Pub. No.: WO2023/105649
PCT Pub. Date: Jun. 15, 2023

(65) Prior Publication Data
US 2024/0422623 A1 Dec. 19, 2024

(51) Int. Cl.
*H04W 28/20* (2009.01)
*H04W 72/0453* (2023.01)
*H04W 72/541* (2023.01)

(52) U.S. Cl.
CPC ....... *H04W 28/20* (2013.01); *H04W 72/0453* (2013.01); *H04W 72/541* (2023.01)

(58) Field of Classification Search
CPC .............. H04W 28/20; H04W 72/541; H04W 72/0453
See application file for complete search history.

(56) References Cited

U.S. PATENT DOCUMENTS

| | | | |
|---|---|---|---|
| 7,006,850 B1 * | 2/2006 | James | G01C 23/00 |
| | | | 455/500 |
| 7,310,573 B2 * | 12/2007 | Stickling | H04B 15/00 |
| | | | 244/1 R |

(Continued)

FOREIGN PATENT DOCUMENTS

| | | |
|---|---|---|
| CN | 102170642 A | 8/2011 |
| CN | 105979537 A | 9/2016 |

(Continued)

OTHER PUBLICATIONS

Chinese Office Action of Sep. 29, 2024 of corresponding Chinese Patent Application No. 202180104777.0.

(Continued)

*Primary Examiner* — Jasper Kwoh
(74) *Attorney, Agent, or Firm* — Spencer Fane LLP

(57) ABSTRACT

A communication control device is configured to select a communication frequency band for communicating between a vehicle and an external base station when starting communication between the vehicle and the external base station. In selecting the communication frequency band, the communication control device measures or determines the amount of electromagnetic noise in each frequency band inside the cockpit module, and including the communication frequency band. Then, the communication control device identifies an electrical device that is a source of the electromagnetic noise based on frequency bands in which the amount of electromagnetic noise is greater than or equal to a predetermined value. The communication control device sets an operating clock frequency of the electrical device to a first frequency band that differs from the communication frequency band.

2 Claims, 9 Drawing Sheets

(56) References Cited

U.S. PATENT DOCUMENTS

| | | | |
|---|---|---|---|
| 2008/0021690 A1 | 1/2008 | Segesaka | |
| 2010/0202495 A1* | 8/2010 | Kagawa | B60T 7/22 |
| | | | 375/142 |
| 2018/0259560 A1 | 9/2018 | Miyaji et al. | |
| 2022/0150006 A1* | 5/2022 | Shusterman | H04L 5/0073 |
| 2024/0104046 A1* | 3/2024 | Nie | G06F 1/08 |

FOREIGN PATENT DOCUMENTS

| | | |
|---|---|---|
| CN | 109738722 A | 5/2019 |
| CN | 109767524 A | 5/2019 |
| CN | 111757502 A | 10/2020 |
| CN | 111933105 A | 11/2020 |
| CN | 112964956 A | 6/2021 |
| EP | 1 432 154 A2 | 6/2004 |
| EP | 1505303 A1 | 2/2005 |
| JP | 2002-262327 A | 9/2002 |
| JP | 3448651 B1 | 9/2003 |
| JP | 2007-243765 A | 9/2007 |
| JP | 2007-290488 A | 11/2007 |
| JP | 2018-148738 A | 9/2018 |
| WO | 2021/021114 A1 | 2/2021 |

OTHER PUBLICATIONS

Extended European Search Report of Dec. 17, 2024 of corresponding European Patent Application No. 21966579.1.
Office Action of Jun. 13, 2025 of corresponding Chinese Patent Application No. 202180104777.0.

* cited by examiner

COMMUNICATION CONTROL DEVICE AND COMMUNICATION CONTROL METHOD

CROSS-REFERENCE TO RELATED APPLICATIONS

This application is a U.S. national stage application of International Application No. PCT/JP2021/045006, filed on Dec. 7, 2021.

BACKGROUND

Technical Field

The present invention relates to a communication control device and a communication control method.

Background Information

Vehicles capable of wireless communication with base stations have been developed in the prior art.

Japanese Patent No. 3448651 (Patent Document 1), for example, discloses a communication control method in a vehicle-to-infrastructure communication system that uses different frequencies in different communication areas, wherein the communication frequency used in a next communication area is switched to upon detection of the angle of arrival of radio waves received from a wireless base station antenna.

SUMMARY

The prior art performs processes with which the overall amount of noise can be reduced, thereby improving the accuracy of communication with a wireless base station.

However, processes that reduce the overall amount of noise are resource-intensive and are associated with the problem of degraded communication characteristics due to the influence of parts where the amount of noise cannot be reduced despite attempts to reduce the amount of noise.

The present invention was devised in light of this problem and has as an object to provide a communication control device and communication control method capable of improving communication quality without carrying out a process to reduce the overall amount of noise in vehicles capable of wireless communication with base stations.

When initiating communication between a vehicle and an external base station 200, a communication control device 100 according to one aspect of the present invention measures or determines the amount of electromagnetic noise in each frequency band inside a cockpit module to select a communication frequency band between the vehicle and the external base station 200, identifies an electrical device that is a source of electromagnetic noise, and sets the operating clock frequency of that electrical device to a first frequency band that differs from the communication frequency band.

By means of the present invention, the communication quality can be improved in vehicles capable of wireless communication with base stations without carrying out a process to reduce the overall amount of noise.

BRIEF DESCRIPTION OF THE DRAWINGS

Referring now to the attached drawings which form a part of this original disclosure, illustrative embodiments are shown.

DETAILED DESCRIPTION

Illustrative embodiments of the present disclosure are described below with reference to the drawings.

The configuration of a communication control device 100 according to the present embodiment will be described with reference to FIGS. 1 and 2.

The communication control device 100 is installed in a vehicle. In the present embodiment, as shown in FIG. 1, the communication control device 100 controls communication between the vehicle and an external base station 200. Further, in the present embodiment, as shown in FIG. 1, the communication control device 100 can be connected to electrical devices 60, which are onboard devices. Specifically, the communication control device 100 can be connected to a plurality of the electrical devices 60.

The communication control device 100 can be connected to an antenna 11 for wireless communication with the base station 200. The wireless communication may be 5G (5th generation mobile communication system), Long Term Evolution (LTE, 4G), or Wi-Fi, etc. FIG. 2 is a diagram showing an arrangement relationship between the electrical devices 60 and the antenna 11 inside the vehicle. As shown in FIG. 2, the electrical devices 60, which can be noise sources, and the antenna 11 are arranged inside the cockpit module (dashboard). In one example, an antenna 11-2 is located directly next to a heads-up display (H/U display) 60-2 and is thus susceptible to the effects of noise. It is therefore important to reduce the influence of such noise when 5G communication or the like is carried out.

Figure 3:
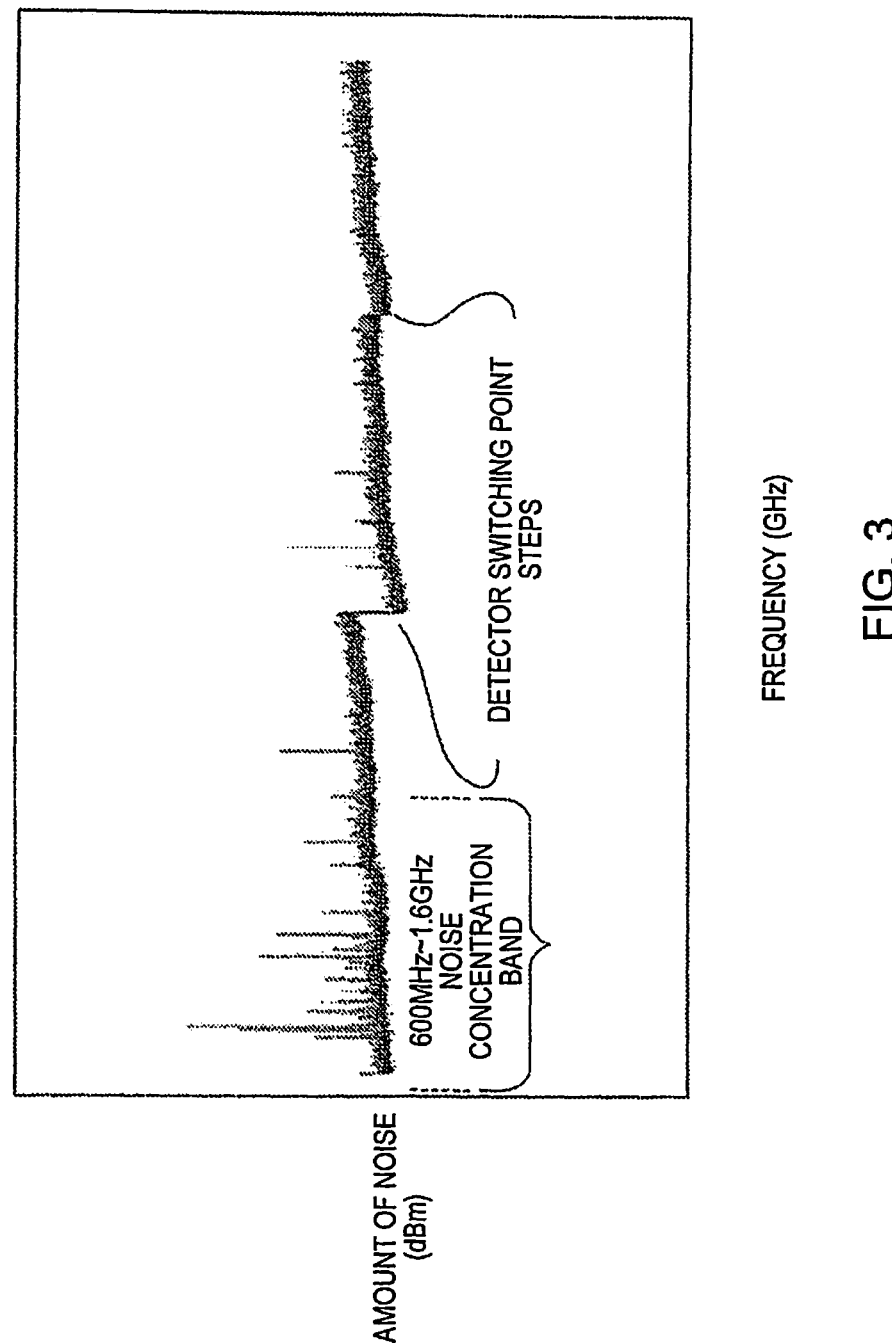
FIG. 3 is a diagram showing in-vehicle noise in a stand-alone (SA) 50 communication frequency band.

FIG. 3 is a diagram showing in-vehicle noise in stand-alone (SA) 5G communication frequency bands. The strong peaks seen in the band where noise is concentrated indicate the amount of noise that increases when the vehicle is in the ON state or the electrical devices are in the ON state. As shown in FIG. 3, it can be seen that noise is concentrated in a specific frequency band.

In the present embodiment, communication with the base station 200 is carried out while avoiding such in-vehicle noise that is generated when the vehicle is in the ON state or the electrical components are in the ON state. Therefore, in the present embodiment, two general types of embodiments will be described: one in which the clock frequencies of noise sources are changed, and one in which the communication frequency is changed to higher frequency bands, etc., having less noise. Either of these may be implemented, or both may be implemented in combination. For example, it is possible to implement whichever of the two embodiments is more appropriate depending on the circumstances in cases in which noise cannot be avoided as long as the vehicle is in the ON state, even when electrical devices which are noise sources are OFF.

The description shall be continued by returning to FIG. 1. The communication control device 100 is provided with a communication control unit 10 that is connected to the antenna 11, a setting unit 20, an electrical device control unit 30, and an output unit 40.

The communication control unit 10 controls wireless communication with the base station 200 via the antenna 11. Specifically, when initiating communication between the vehicle and the external base station 200, the communication control unit 10 selects the communication frequency band between the vehicle and the external base station 200. This communication frequency band may be assigned by the base station 200 or may be a communication frequency band (i.e., at least one communication channel) set by the setting unit 20, described further below, from among multiple assigned communication frequency bands (i.e., a plurality of communication channels). The plurality of frequency bands used in the communication control device 100 may be, for example, high UHF bands (i.e., several GHz). In the present embodiment, the plurality of frequency bands used in the communication device 100 may be two frequency bands, one of which is referred to as a first frequency band and the other as a second frequency band, the first frequency band being a 5 GHz band and the second frequency band being a 2.4 GHz band, for example. In each frequency band, a number of channels can be used, which is obtained by dividing the frequency band by a specific bandwidth. For example, if the second frequency band (e.g., 2.4 GHz to 2.48 GHz) is divided by the specific bandwidth of 2 MHz, then 40 frequency channels will be available, any one of which may be selected and used as the communication frequency band. It should be noted that it is also possible, for example, to use an extremely high frequency band (EHF, known as the millimeter wave band) corresponding to frequencies from 52.6 GHz to 114.25 GHz.

Figure 1:
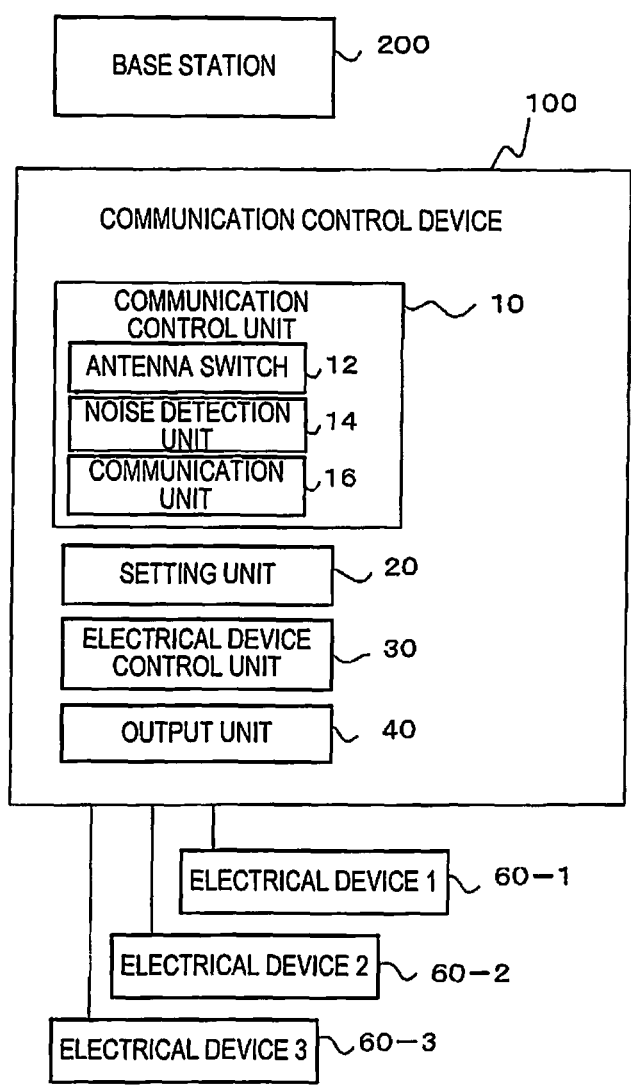
FIG. 1 is a block diagram showing one example of the configuration of a communication control device 100.
Figure 2:
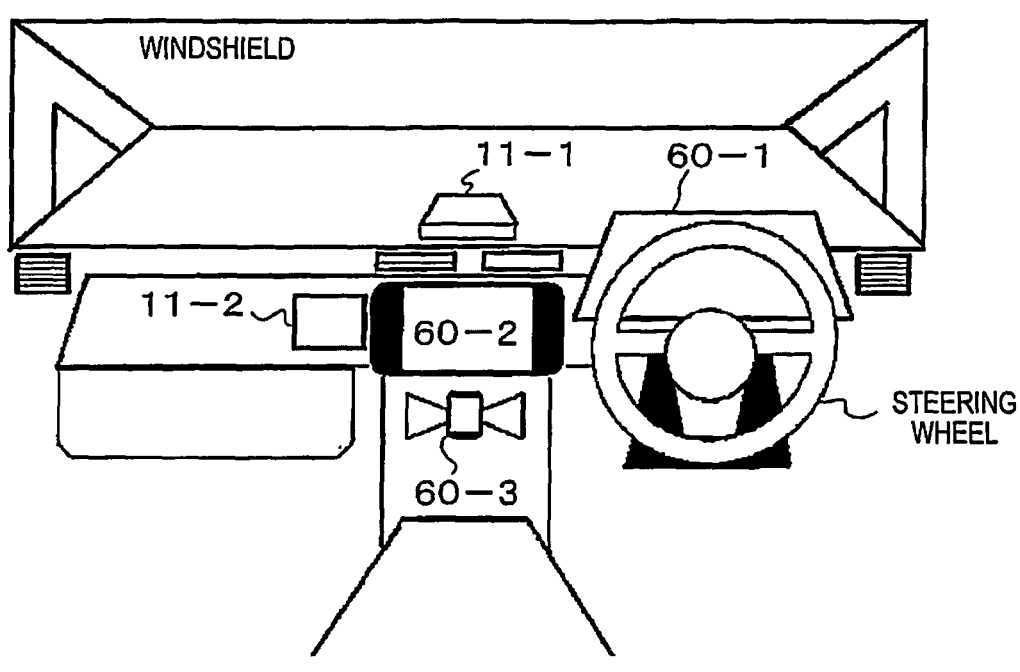
FIG. 2 is a diagram showing an arrangement relationship between electrical devices 60 and an antenna 11 in a vehicle.

As shown in FIG. 1, the communication control unit 10 is provided with an antenna switch 12, which performs switching of the antenna 11, a noise detection unit 14, and a communication unit 16.

The antenna switch 12 is connected to the antenna 11. The antenna switch 12 may also be connected to a bandpass filter (BPF) that transmits or blocks specific frequency bands. It should be noted that frequency switching may be carried out using known technologies, such as frequency hopping.

The noise detection unit 14 measures or determines the amount of electromagnetic noise in each frequency band inside the cockpit module. The noise detection unit 14 may also measure or determine the amount of noise from outside the vehicle. The noise detection unit 14 may also perform an analytical process to identify noise inside the vehicle and noise outside the vehicle. For example, when only one of the electrical devices 60 is in the ON state, the noise detection unit 14 can measure the noise and store the frequency of the noise generated by that electrical device 60 in association with the electrical device 60. The noise detection unit 14 is thus able to analyze noise over a wide range of frequencies to separate noise in the vehicle from noise outside the vehicle.

The communication unit 16 communicates with the base station 200 via the antenna 11. Further, the communication unit 16 itself may be the antenna 11.

It should be noted that the communication control unit 10, and/or the setting unit 20, and/or the electrical device control unit 30 of the communication control device 100 may be realized by a computer (e.g., an Electronic Control Unit) including a CPU, ROM, RAM, and semiconductor memory such as flash memory. In other words, each part of the communication control device 100 may be configured to use a CPU or the like to realize the various functions by executing programs stored in storage media.

When communication between the vehicle and the external base station 200 is initiated, the setting unit 20 selects a communication frequency band between the vehicle and the external base station 200. Typically, the communication frequency is selected in accordance with a frequency assigned by the base station 200. In addition to or instead of this, in the present embodiment (the first embodiment), the setting unit 20 sets the communication frequency band based on the amount of electromagnetic noise measured or determined by the noise detection unit 14. Alternatively, in addition to or instead of this, in the present embodiment (the second embodiment), the setting unit 20 sets the operating clock frequencies of the electrical devices 60 based on the amount of electromagnetic noise measured or determined by the noise detection unit 14.

In the first embodiment, the setting unit 20 sets a communication frequency band that avoids in-vehicle noise, for example. This can realize good communication based on the amount of electromagnetic noise in the communication frequency band, thereby avoiding noisy frequency bands. The setting unit 20 may also perform a process to determine the amount of noise outside the vehicle and avoid in-vehicle noise. By distinguishing noise outside the vehicle from noise inside the vehicle in this manner, improved communication can be achieved. The setting unit 20 may also set the communication frequency band based on the amount of electromagnetic noise measured based on the speed of the vehicle. The amount of noise increases with vehicle speed due to such factors as a higher rate of switching between frequencies during handovers (H/O). Thus, by measuring the amount of electromagnetic noise prior to initiating communication, a frequency can be set to avoid electromagnetic noise more quickly when communication is initiated.

The setting unit 20 may detect when any of the electrical devices 60, which are onboard devices, are in the activated (ON) state and set the communication frequency band based on the amount of electromagnetic noise measured based on the activation state. The amount of electromagnetic noise can be measured in advance, triggered by operation of electrical devices having a large amount of electromagnetic noise, such as the air conditioner, navigation system, radio, etc., to set a frequency to avoid electromagnetic more quickly when communication is initiated.

Further, the setting unit 20 selects a communication frequency band from among a plurality of frequency bands (e.g., a plurality of channels). Selecting the communication frequency band in this way allows setting a frequency that avoids electromagnetic noise. Further, when selecting from among a plurality of frequency bands, the setting unit 20 sets the communication frequency band starting from higher frequencies. Preferential selection of higher frequency bands having lower amounts of electromagnetic noise thereby makes it possible to set a frequency while avoiding electromagnetic noise.

Further, the setting unit 20 estimates a communication frequency band switching area and measures the amount of electromagnetic noise in order to select a communication frequency band for a new external base station. The amount of electromagnetic noise is thus measured prior to arriving at a location where the communication frequency will switch (I/O), making it possible to set a frequency to avoid electromagnetic noise more quickly when communication is initiated.

In the second embodiment, the setting unit 20 identifies any electrical device 60 that is a source of electromagnetic noise based on a frequency band that contains an amount of electromagnetic noise greater than or equal to a prescribed value and sets the operating clock frequency of the electrical device to a first frequency band that differs from the communication frequency band. Since the amount of electromagnetic noise in the communication frequency band is measured when communication is initiated, identifying an electrical device that is a noise source and setting the operating clock frequency of this electrical device to the first frequency band results in good communication in which the influence of noise is reduced.

Further, the setting unit 20 changes the operating clock frequency of the electrical device 60 to the second frequency band if the amount of electromagnetic noise in the first frequency band is greater than or equal to the prescribed value. If the amount of noise is still high even after the operating clock frequency has been set to the first frequency band, setting the operating clock frequency to the second frequency band will result in good communication in which the influence of electromagnetic noise is reduced.

Further, the setting unit 20 sets the second frequency band to a higher frequency than the first frequency band. By setting the fundamental wave of the operating clock frequency to a higher frequency band, the harmonics of the fundamental frequency will also be in a higher frequency band, and the distance between the fundamental and the harmonic frequencies will also increase, thereby resulting in good communication in which the influence of electromagnetic noise is reduced.

Further, the setting unit 20 decomposes the frequency distribution of the measured electromagnetic noise to identify an electrical device 60 that is a noise source. Decomposing the frequency distribution makes it possible to identify the frequency of the fundamental wave from the harmonic components and to reliably identify an electrical device that is an electromagnetic noise source.

Further, if it has been detected that an electrical device 60 that has been identified as an electromagnetic noise source is performing control pertaining to vehicle travel, the setting unit 20 does not change the operating clock frequency until the control executed by the electrical device has been completed. Control that maintains the safe travel of the vehicle is thereby possible, since the operating clock frequency is not changed while the electrical device that has been identified as the electromagnetic noise source performs control related to vehicle travel.

Further, when switching the operating clock frequency of the electrical device 60, the setting unit 20 uses the output unit 40 to notify the user of the switch ahead of time. Notifying the user ahead of time that the operating clock frequency will be switched makes it possible to receive the user's consent regarding the switch.

The electrical device control unit 30 is connected to each of the electrical devices 60 and controls the electrical devices 60. The electrical device control unit 30 may be implemented using a control unit such as an IVI (in-vehicle infotainment) unit.

The output unit 40 is an output means such as a speaker or display.

Figure 5:
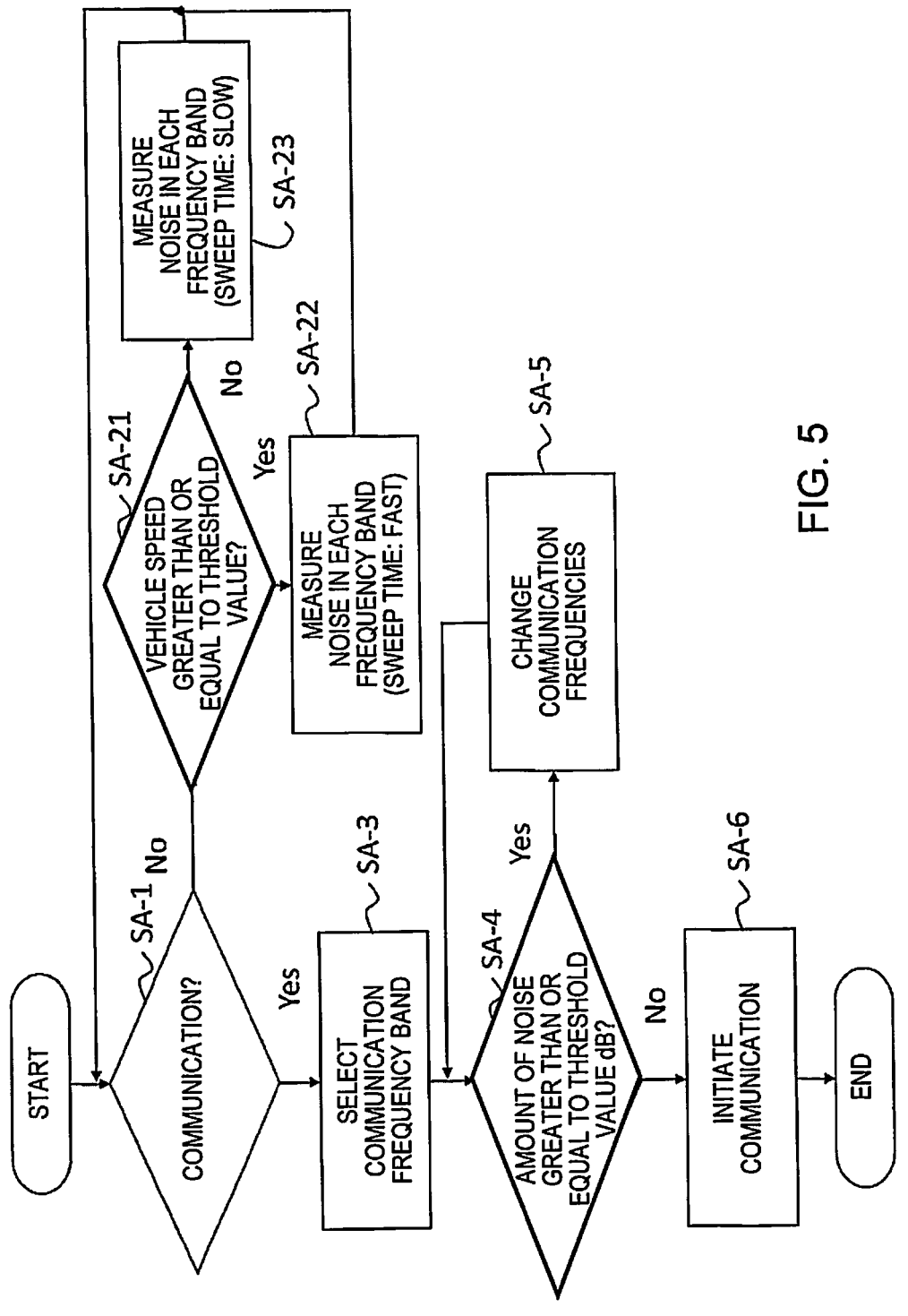
FIG. 5 is a flowchart showing an example of processing according to the first embodiment.
Figure 6:
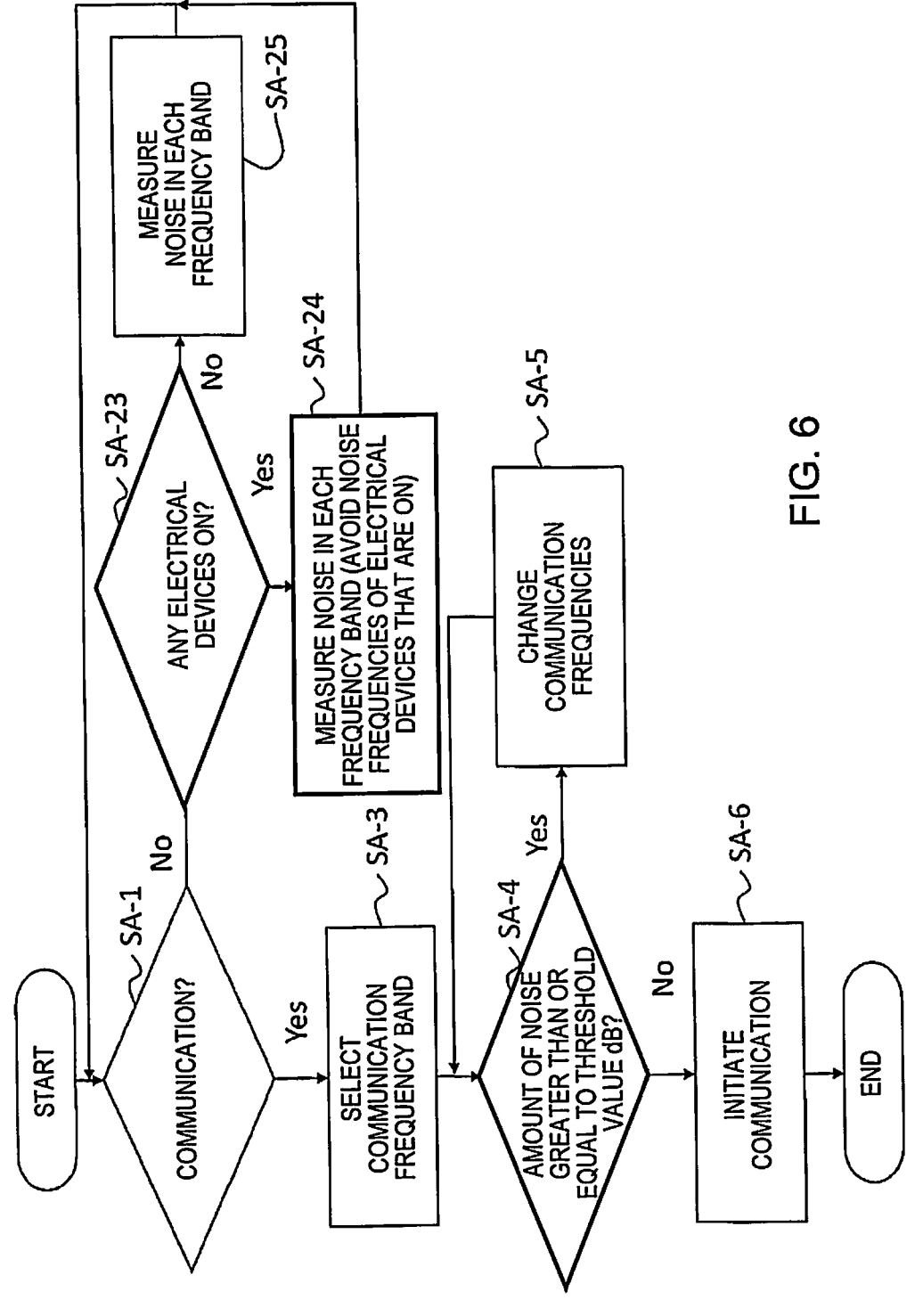
FIG. 6 is a flowchart showing an example of processing according to the first embodiment.

An example of the processing of the first embodiment will now be described using the flowcharts of FIGS. 4 to 6.

Figure 4:
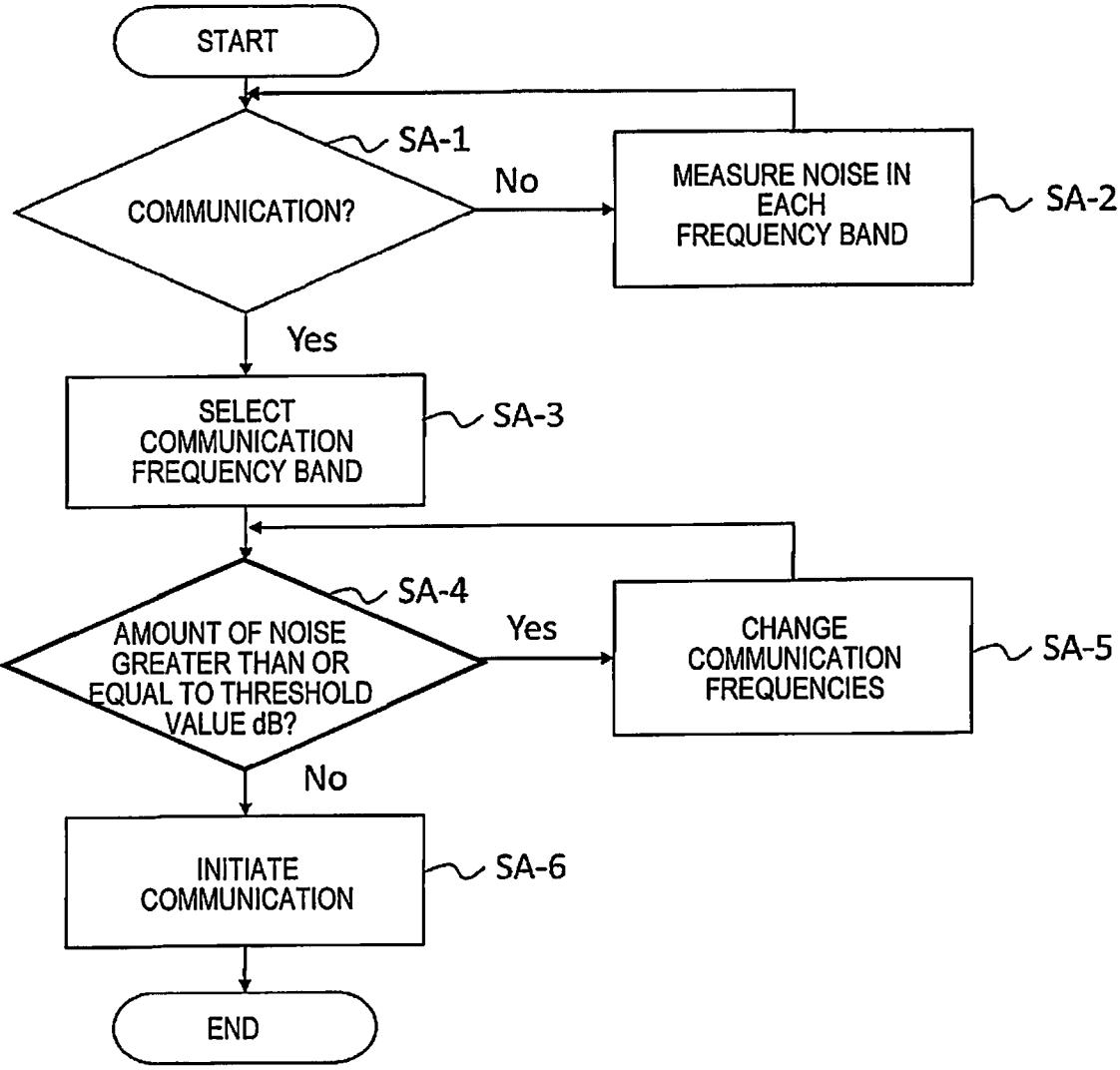
FIG. 4 is a flowchart showing an example of processing according to a first embodiment.

First, as shown in FIG. 4, the communication control unit 10 of the communication control device 100 determines whether communication is to be carried out (SA-1). For example, the communication control unit 10 determines that communication is to be initiated with a new base station 200 when the vehicle is started or at H/O If communication is not to be carried out (SA-1, NO), the communication control unit 10 measures the noise in each frequency band using the noise detection unit 14 (SA-2).

On the other hand, if communication is to be carried out (SA-1, YES), the communication control unit 10 selects a communication frequency band through communicates with the base station 200 via the communication unit 16 at the time communication is initiated (SA-3). The communication frequency band used here is typically the communication frequency band assigned by the base station 200.

The noise detection unit 14 then measures or determines the amount of electromagnetic noise in each frequency band inside the cockpit module (SA-4). As described above, the noise detection unit 14 may directly detect the amount of noise inside the cockpit module, i.e., in the vehicle, or may determine the in-vehicle amount of noise through a process of decomposing the frequency distribution based on the overall amount of noise, including both noise outside the vehicle and noise inside the vehicle.

If the in-vehicle noise is greater than or equal to a prescribed threshold value (dB) (SA-4, YES), the setting unit 20 communicates with the base station 200 by controlling the communication control unit 10 to receive the assignment of a new communication frequency band and changes the communication frequency band accordingly (SA-5). It should be noted that this is not a limitation, and the setting unit 20 may also change the communication frequency by changing channels within an already assigned communication frequency band.

If the in-vehicle noise is less than the prescribed threshold value (dB) (SA-4, NO), the communication control unit 10 initiates communication via the communication unit 16 (SA-6).

The foregoing is an example of the basic processing of the first embodiment. An example of threshold value control when amount of noise is measured based on vehicle speed will now be described using FIG. 5. It should be noted that in the following, the same step numbers may be used for parts that perform the same processing as described above, and the explanations of this processing may be omitted.

If communication is not to be carried out in the basic processing described above (SA-1, NO), the communication control unit 10 determines whether the vehicle speed is greater than or equal to a threshold value (km/h) (SA-21). Vehicle speed sensors and/or GPS positioning information may be used for this determination.

If the vehicle speed is greater than or equal to the threshold value (km/h) (SA-21, YES), the noise detection unit 14 measures the noise in each frequency band using a fast sweep time (SA-22).

On the other hand, if the vehicle speed is below the threshold value (km/h) (SA-21, NO), the noise detection unit 14 measures the noise in each frequency band using a slow sweep time (SA-23).

If the vehicle speed increases, the amount of noise also increases due to such factors as a higher rate of frequency switching due to handovers (H/O), and therefore careful measurement of the amount of noise allows the setting of frequencies while avoiding electromagnetic noise, which can improve communication accuracy.

The foregoing is an example of threshold control when the amount of noise is measured based on vehicle speed. An example of the control of noise measurement when vehicle operation is performed in the basic processing of the first embodiment will now be described using FIG. 6.

In the basic processing described above, if communication is not to be performed (SA-1, NO) and any of the electrical devices 60 are ON (SA-23, YES), then the noise detection unit 14 of the communication control unit 10 measures noise in each frequency band while avoiding the noise frequencies of the electrical devices 60 that are on (SA-24). For example, as discussed above, the noise detection unit 14 may store the electrical devices 60 and noise frequencies in association with each other ahead of time in the storage unit and perform noise measurements by referencing the storage unit in order to avoid the noise frequencies of the electrical devices 60 which are ON.

If none of the electrical devices 60 is ON (SA-23, NO), on the other hand, the noise detection unit 14 of the communication control unit 10 measures the noise in each frequency band (SA-25).

The setting unit 20 can thus set the communication frequency more accurately when initiating communication based on the noise measurement results and avoid the noise frequencies of any of the electrical devices 60 that are ON. This completes the description of the process of the first embodiment.

Figure 7:
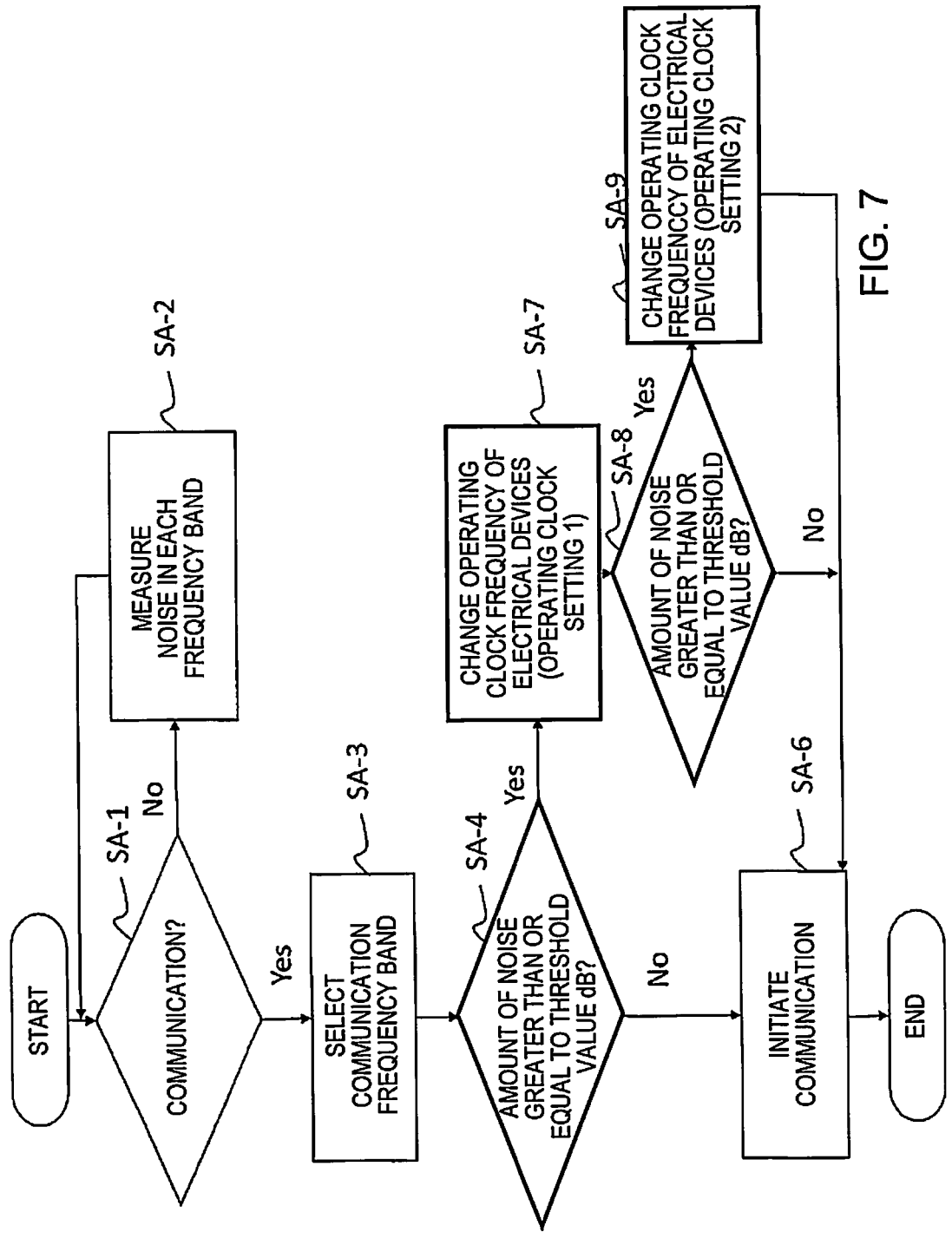
FIG. 7 is a flowchart showing an example of processing according to a second embodiment.

An example of the processing of the second embodiment will now be described using the flowcharts of FIGS. 7 to 9. In the second embodiment, instead of setting (changing) the communication frequency to avoid the noise frequencies as in the first embodiment, the noise frequencies are set (changed) to avoid the communication frequency.

Specifically, if the in-vehicle noise in Step SA-4 above is greater than or equal to the prescribed threshold value (dB) (SA-4, YES), the setting unit 20 changes the operating clocks of the electrical devices 60 to an operating clock setting 1 (a first frequency band that differs from the communication frequency band) (SA-7).

Noise measurement is again carried out (SA-8), and if the in-vehicle noise is greater than or equal to the prescribed threshold value (dB) (SA-8, YES), the setting unit 20 changes the operating clocks of the electrical devices 60 to an operating clock setting 2 (a second frequency band that differs from the communication frequency band) (SA-9). Therefore, if the amount of noise is still high even after setting the operating clock frequency to the first frequency band, setting the operating clock frequency to the second frequency band will result in good communication in which the influence of electromagnetic noise is reduced. It should be noted that the setting unit 20 can achieve good communication in which the influence of electromagnetic noise is still further reduced by setting the second frequency band to a higher frequency than the first frequency band.

The foregoing is one example of the basic processing of the second embodiment. FIG. 8 will now be used to describe an example of processing for identifying noise sources by carrying out frequency analysis based on the amount of noise measurement results in Step SA-2 of the basic processing.

Figure 8:
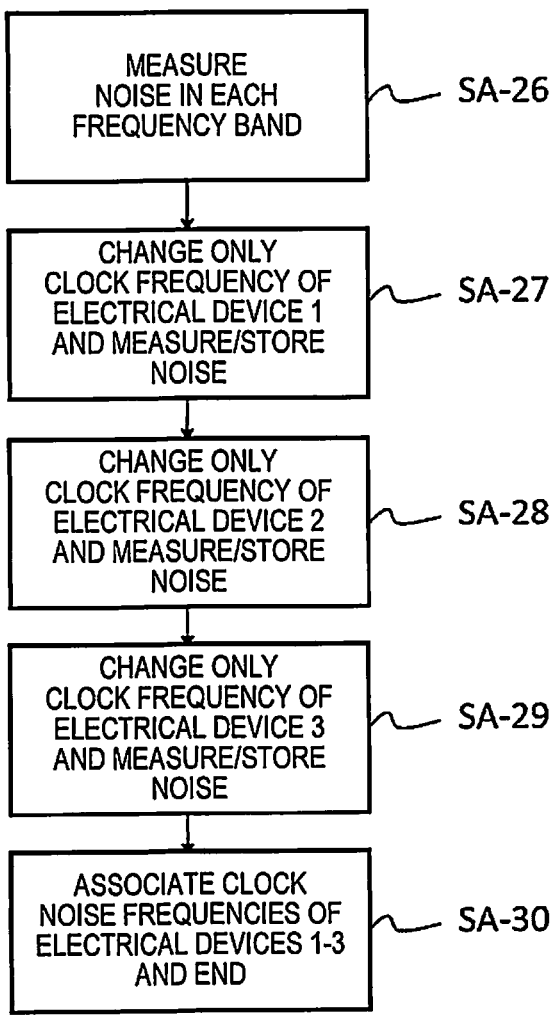
FIG. 8 is a flowchart showing an example of processing according to the second embodiment.

As shown in FIG. 8, the noise detection unit 14 measures the noise in each frequency band (SA-26).

The noise detection unit 14 changes only the clock frequency of an electrical device 60-1, measures the noise, and stores the result in a storage unit (SA-27). This process is carried out for the other electrical devices 60 (SA-28, 29).

The clock noise frequencies associated with the electrical devices 60-1 to 60-3 can be stored in the storage unit, thereby allowing the setting unit 20 to identify the electrical devices 60 based on the noise frequencies by referencing the associations in the storage unit and to set the clock frequency of any of the electrical devices 60 that are noise sources to a frequency that differs from the communication frequency band.

The foregoing is an example of processing in which, in Step SA-2 of the basic processing, frequency analysis is performed based on amount of noise measurement results in order to identify noise sources. An example of an operating clock setting process that takes into consideration vehicle travel safety in Steps SA-7 to SA-9 of the basic process will now be described with reference to FIG. 9.

Figure 9:
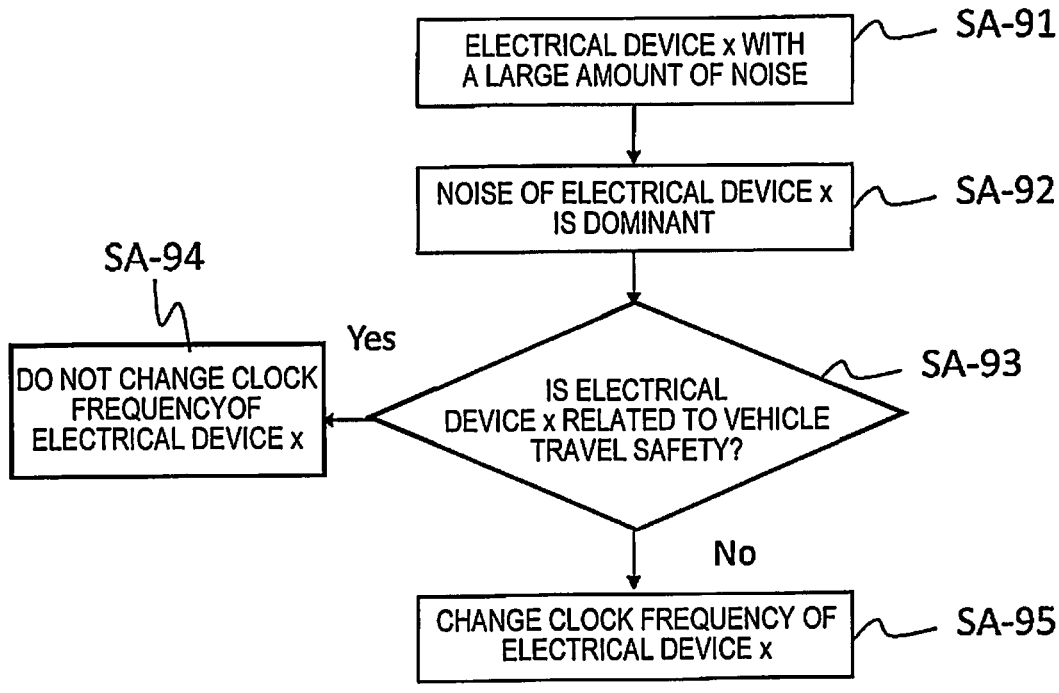
FIG. 9 is a flowchart showing an example of processing according to the second embodiment.

As shown in FIG. 9, the setting unit 20 uses the associations described above in the storage unit to identify an electrical device X that is a noise source based on noise measurement results in Step SA-4 or SA-8 (SA-91).

If the setting device 20 determines that the noise from the electrical device X is dominant, e.g., the amount of noise is greater than or equal to a threshold value (SA-92), the setting unit then determines whether the electrical device X is an onboard device related to vehicle travel safety (SA-93). For example, the electrical devices 60 such as the speedometer, the navigation system while in use, collision avoidance safety devices, etc., may be determined to be onboard devices related to vehicle travel safety.

If the electrical device X is an onboard device related to vehicle travel safety (SA-93, YES), the setting unit 20 does not change the clock frequency of the electrical device X (SA-94).

On the other hand, if the electrical device X is an onboard device that is not essential to vehicle travel safety (e.g., an air conditioner) (SA-93, NO), the setting unit 20 changes the clock frequency of the electrical device X (SA-95).

This makes it possible to perform control that maintains the travel safety of the vehicle by avoiding a change in the operating clock frequency of any electrical device that has been identified as an electromagnetic noise source but that is related to vehicle control. It should be noted that the setting unit 20 may use the output unit 40 to notify the user ahead of time of any change in the operating clock frequency of an electrical device 60, and may also be configured not to change the clock frequency unless the user's consent can be confirmed.

That completes the description of the processing of the present embodiment. It should be noted that some of the processing of the first embodiment may be implemented in combination with some of the processing of the second embodiment as desired.

In the first embodiment, the communication control device 100 carries out communication by setting the communication frequency band based on the amount of electromagnetic noise measured or determined through noise detection when communication between the vehicle and an external base station 200 is initiated. The amount of electromagnetic noise inside the cockpit module is measured when communication with an external base station is initiated in order to achieve good communication while avoiding noise frequency bands based on the amount of electromagnetic noise in the communication frequency band.

Further, the communication control device 100 may also set the communication frequency band based on the amount of electromagnetic noise measured based on the speed of the vehicle. Distinguishing between noise inside and outside the vehicle in this way results in improved communication.

The communication control device 100 may also set the communication frequency band based on the amount of electromagnetic noise measured based on the vehicle speed. The greater the vehicle speed, the greater the amount of noise due to such factors that include a higher rate of frequency switching at handovers (H/O), etc., so that the measuring the amount of electromagnetic noise prior to initiating communication allows the setting of a frequency that avoids electromagnetic noise more quickly when communication is initiated.

The communication control device 100 may also detect the activated (ON) state of any of the electrical devices 60, which are onboard devices, and set the communication frequency band based on the amount of electromagnetic noise measured based on the activation states. The amount of electromagnetic noise can be measured in advance, triggered by the operation of electrical devices having a large amount of electromagnetic noise, such as an air conditioner, navigation system, radio, etc., in order to set a frequency for avoiding electromagnetic noise prior to initiating communication.

The communication control device 100 selects the communication frequency band from a plurality of frequency bands (i.e., a plurality of channels). Selecting the communication frequency band in this way allows the setting of a frequency that avoids electromagnetic noise.

Further, the communication control device 100 selects the communication frequency band from the plurality of frequency bands starting from higher frequencies. Preferential selection of the communication frequency band starting from higher frequency bands with lower amount of electromagnetic noise allows the setting of a frequency that avoids electromagnetic noise.

Further, the communication control device 100 measures the amount of electromagnetic noise to estimate a communication frequency band switching area and select a communication frequency band for a new external base station. Measuring the amount of electromagnetic noise before reaching a location in which the communication frequency is switched (H/O) allows setting a frequency that avoids electromagnetic noise more quickly when communication is initiated.

In the second embodiment, the communication control device 100 identifies any of the electromagnetic devices 60 that are a source of electromagnetic noise based on frequency bands having an amount of electromagnetic noise greater than or equal to a prescribed value, and sets the operating clock frequencies of those electrical devices to a first frequency that differs from the communication frequency band. Measuring the amount of electromagnetic noise in the communication frequency band when communication is initiated makes it possible to identify electrical devices that generate noise and to set the operating clock frequencies of these electrical devices to the first frequency band, thereby achieving good communication in which the influence of noise is reduced.

Further, the communication control device 100 changes the operating clock frequencies of the electrical devices 60 to a second frequency band if the amount of electromagnetic noise in the first frequency band is greater than or equal to a prescribed value. By setting the operating clock frequencies to a second frequency band if the amount of noise remains high after setting the operating clock frequencies to the first frequency band, good communication can be achieved in which the influence of electromagnetic noise is reduced.

Further, the communication control device 100 sets the second frequency band to a frequency higher than the first frequency band. By setting the fundamental wave of the operating clock frequency to a higher frequency band, the harmonics will also be in higher frequency bands, and the distance between the fundamental and harmonic frequencies will also increase, thereby achieving good communication in which the influence of electromagnetic noise can be reduced.

Further, the communication control device 100 analyzes the frequency distribution of the measured electromagnetic noise to identify an electrical device 60 that is an electromagnetic noise source. Analyzing the frequency distribution makes it possible to identify the fundamental frequency from the harmonic components and reliably identify electrical devices that are electromagnetic noise sources.

Further, the communication control device 100 does not change the operating clock frequencies of any electrical device 60 that has been identified as an electromagnetic noise source and that has been detected as performing control involved pertaining to vehicle travel safety until the control by said electrical device is completed. Thus, by not changing the operating clock frequency of any electrical device that has been identified as an electromagnetic noise source and that performs control pertaining to vehicle travel safety, control that maintains vehicle travel safety is possible.

Further, the communication control device 100 uses the output unit 40 to notify the user ahead of time of any change in the operating clock frequency of an electrical device 60. By notifying the user ahead of time that the operating clock frequency will be changed, the user's consent pertaining to the change can be confirmed.

Although embodiments of the present disclosure have been described above, the above-described embodiments do not limit the present disclosure, which can be variously modified and implemented.

In the above-described embodiments, the communication control device 100 was provided with one communication control device 100 and a plurality of electrical devices 60, but the present disclosure is not limited in this way. For example, the communication system in the present disclosure may be provided with one communication control device 100 and one electrical device 60. Alternatively, the communication system in the present disclosure may be provided with a plurality of communication control devices 100 and one electrical device 60.

In the above-described embodiments, the communication control device 100 was installed in a vehicle, but the present disclosure is not limited in this way. For example, the communication control device 100 may be installed in various types of devices other than vehicles and may be used connected to various types of devices.

The communication control method described in the present disclosure may be realized by a dedicated computer provided by configuring memory and processors programmed to execute one or more functions embodied by a computer program. Alternatively, the communication control method described in the present disclosure may be realized by a dedicated computer provided by configuring a processor using one or more dedicated hardware logic circuits. Alternatively, the communication control method described in the present disclosure may be realized by one or more dedicated computers configured by a combination of memory units and processors programmed to execute one or more functions and processors configured by one or more hardware logic circuits. The computer programs may be stored in a non-volatile computer-readable physical storage medium as instructions executed by a computer. The means of realizing the functions of the various parts of the communication control device 100 need not necessarily include software, and all of the functions may be realized using one or more pieces of hardware.

In the above-described embodiments, a plurality of functions of one component may be realized by a plurality of components, and one function of one component may be realized by a plurality of components. Further, a plurality of functions of a plurality of components may be realized by one component, and one function realized by a plurality of components may be realized by one component. Further, part of the configuration of the above-described embodiments may be omitted. Further, at least part of the configuration of the above-described embodiments may be added to or replace other configurations of the above-described embodiments.

The invention claimed is:

1. A communication control device that selects a communication frequency band between a vehicle and an external base station when starting communication between the vehicle and the external base station, the communication control device configured to perform:

measuring or determining an amount of electromagnetic noise in each frequency band inside a cockpit module, wherein the measuring or determining the amount of electromagnetic noise in each frequency band includes measuring or determining the amount of electromagnetic noise in the communication frequency band;

identifying an electrical device that is a source of the electromagnetic noise based on frequency bands in which the amount of electromagnetic noise is greater than or equal to a predetermined value;

setting an operating clock frequency of the electrical device to a first frequency band that differs from the communication frequency band; and decomposing a frequency distribution of the measured electromagnetic noise to identify the electrical device that is the source of electromagnetic noise.

2. A communication control device that selects a communication frequency band between a vehicle and an external base station when starting communication between the vehicle and the external base station, the communication control device configured to perform:

measuring or determining an amount of electromagnetic noise in each frequency band inside a cockpit module, wherein the measuring or determining the amount of electromagnetic noise in each frequency band includes measuring or determining the amount of electromagnetic noise in the communication frequency band;

identifying an electrical device that is a source of the electromagnetic noise based on frequency bands in which the amount of electromagnetic noise is greater than or equal to a predetermined value;

setting an operating clock frequency of the electrical device to a first frequency band that differs from the communication frequency band; and upon detecting the electrical device having been identified as the source of electromagnetic noise is performing a control pertaining to vehicle travel, the operating clock frequency not being changed until the control executed by the electrical device has been completed.

* * * * *